United States Patent
Sullivan et al.

(10) Patent No.: US 11,724,688 B2
(45) Date of Patent: Aug. 15, 2023

(54) CONTROL MODULE AND CONTROL METHOD FOR A VEHICLE POWERTRAIN

(71) Applicant: JAGUAR LAND ROVER LIMITED, Coventry (GB)

(72) Inventors: Matt Sullivan, Hinckley (GB); Olivier Roques, Banbury (GB); William Harrison, Coventry (GB); Harry Sadler, Belper (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 19 days.

(21) Appl. No.: 17/440,540

(22) PCT Filed: Mar. 13, 2020

(86) PCT No.: PCT/EP2020/056948
§ 371 (c)(1),
(2) Date: Sep. 17, 2021

(87) PCT Pub. No.: WO2020/187782
PCT Pub. Date: Sep. 24, 2020

(65) Prior Publication Data
US 2022/0153254 A1    May 19, 2022

(30) Foreign Application Priority Data
Mar. 19, 2019    (GB) ...................... 1903750

(51) Int. Cl.
*B60W 10/08*    (2006.01)
*B60W 20/30*    (2016.01)
(Continued)

(52) U.S. Cl.
CPC ............. *B60W 20/30* (2013.01); *B60K 6/485* (2013.01); *B60K 6/547* (2013.01); *B60W 10/06* (2013.01);
(Continued)

(58) Field of Classification Search
CPC ...... B60W 20/30; B60W 10/06; B60W 10/08; B60W 10/11; B60W 20/15; B60W 30/19;
(Continued)

(56) References Cited

U.S. PATENT DOCUMENTS

| | | | |
|---|---|---|---|
| 8,298,118 B2 * | 10/2012 | Kim ...................... | B60W 10/08 477/6 |
| 2006/0135316 A1 | 6/2006 | Fujii et al. | |

(Continued)

OTHER PUBLICATIONS

International Search Report corresponding to International Application No. PCT/EP2020/056948, dated Aug. 14, 2021, 4 pages.
(Continued)

*Primary Examiner* — Roger L Pang
(74) *Attorney, Agent, or Firm* — Reising Ethington P.C.

(57) ABSTRACT

Aspects of the present invention relate to a control module (15) for a vehicle powertrain. The powertrain comprises a transmission (14), an engine (12) and an electric machine (16). The control module (15) is configured to receive an input indicative of a requested upshift and in response to the received signal the control module (15) increases the torque output of the engine (12) prior to the start of the torque phase (20). As the torque output of the engine (12) increases the control module (15) decreases the torque output of the electric machine (16) such that a constant wheel torque is applied to the wheels (18) during the torque phase (20) of the upshift.

12 Claims, 5 Drawing Sheets

(51) Int. Cl.
*B60W 20/15* (2016.01)
*B60K 6/485* (2007.10)
*B60K 6/547* (2007.10)
*B60W 10/06* (2006.01)
*B60W 10/11* (2012.01)
*B60W 30/19* (2012.01)

(52) U.S. Cl.
CPC ............ *B60W 10/08* (2013.01); *B60W 10/11* (2013.01); *B60W 20/15* (2016.01); *B60W 30/19* (2013.01); *B60W 2510/1005* (2013.01); *B60W 2710/0666* (2013.01); *B60W 2710/083* (2013.01); *B60W 2710/105* (2013.01); *B60W 2710/1005* (2013.01)

(58) Field of Classification Search
CPC . B60W 2510/1005; B60W 2710/0666; B60W 2710/083; B60W 2710/1005; B60W 2710/105; F16H 2059/147; F16H 2059/148; F16H 2061/0433
USPC .............................................................. 477/3
See application file for complete search history.

(56) References Cited

U.S. PATENT DOCUMENTS

| | | | |
|---|---|---|---|
| 2009/0326778 A1* | 12/2009 | Soliman | B60W 10/06 701/84 |
| 2012/0101697 A1 | 4/2012 | Hawkins | |
| 2012/0130610 A1* | 5/2012 | Lee | F16H 63/502 701/58 |
| 2012/0265382 A1 | 10/2012 | Nefcy | |
| 2013/0153353 A1 | 6/2013 | Teslak | |
| 2013/0296117 A1* | 11/2013 | Shelton | B60W 30/19 477/3 |
| 2018/0257635 A1* | 9/2018 | Meyer | B60W 10/06 |

OTHER PUBLICATIONS

Written Opinion corresponding to International Application No. PCT/EP2020/056948, dated Aug. 14, 2021, 8 pages.

Combined Search and Examination Report corresponding to Great Britain Application No. GB1903750.6, dated Sep. 13, 2019, 6 pages.

* cited by examiner

CONTROL MODULE AND CONTROL METHOD FOR A VEHICLE POWERTRAIN

TECHNICAL FIELD

The present disclosure relates to a control module for a vehicle powertrain. Aspects of the invention relate to a control module, to a method, to a powertrain and to a vehicle.

BACKGROUND

Manufacturers of modern vehicles are continuously striving to reduce the emissions and thus impact the vehicles have on the environment. One way in which manufacturers do this is through the use of an automatic transmission. The automatic transmission may automatically select an appropriate gear to keep the prime mover, typically an internal combustion engine, operating at its most efficient speed and load. Manufacturers can further reduce the impact the vehicle has on the environment by implementing a hybrid mode in which both the internal combustion engine and an electric machine provide torque to the wheels of the vehicle.

It is known to provide an automatic transmission in a hybrid vehicle. However, due to increasing desired comfort levels of vehicles there is a need for more complex automatic transmissions that can gear shift smoothly without unnecessary interruptions to the drive torque delivered to the wheels of the vehicle. Interruptions to the drive torque delivered to the wheels are undesirable as they may detract from the overall drive quality experienced by a user of the vehicle.

It is therefore desirable to maintain a constant wheel torque during a gear change in order to improve the overall comfort and quality of a gear shift in a hybrid vehicle with an automatic transmission.

It is an aim of the present invention to address one or more of the disadvantages associated with the prior art.

SUMMARY OF THE INVENTION

Aspects and embodiments of the invention provide a control module for a vehicle powertrain, a method of controlling a vehicle powertrain, a vehicle powertrain and a vehicle as claimed in the appended claims.

According to an aspect of the present invention there is provided a control module for a vehicle powertrain, the powertrain comprising a transmission, an engine and an electric machine, the engine and the electric machine together delivering a transmission input torque when both the engine and the electric machine are operational, the transmission, the engine and the electric machine together delivering a transmission output torque when both the engine and the electric machine are operational, the transmission being configured to cause a gear upshift from a first gear to a second gear in response to an increase of engine speed, wherein the gear upshift comprises a torque phase and an inertia phase following the torque phase, the control module comprising: an input configured to receive an input signal indicative of a requested gear upshift from the first gear to the second gear; and a processor configured to: (i) determine an engine torque increase from a first engine torque output when the transmission is in the first gear to a second engine torque output when the transmission is in the second gear; and (ii) generate a control output to apply the engine torque increase and control a torque output of the electric machine, such that the transmission output torque is maintained substantially constant throughout the torque phase; wherein the transmission output torque is substantially the same when: the combined transmission input torque comprises the first engine torque output and the transmission is in the first gear, and the combined transmission input torque comprises the second engine torque output and the transmission is in the second gear.

When the powertrain is employed in a vehicle, the transmission output torque, for example the torque applied to an output shaft of the transmission, is delivered to the wheels of the vehicle via one or more driveline components, for example one or more driveshafts and a differential. It will be understood that the one or more driveline components are provided to deliver the transmission output torque to the wheels of the vehicle without multiplying the torque. The transmission output torque can therefore be said to be substantially the same as the torque applied to the wheels of the vehicle. The torque applied to the wheels of the vehicle is referred to herein as the 'wheel torque'.

The control module operates the engine to increase the torque output of the engine prior to the torque phase whilst simultaneously operating the electric machine to maintain a constant wheel torque. This is advantageous as it promotes a constant wheel torque to be delivered to the wheels during the gear shift. There is an inherent lag associated with increasing the torque output of an engine, as required in an upshift, thus the control module requests an early increase in engine torque. This provides a smoother and more comfortable driving experience to a user of the vehicle.

Furthermore, increasing the engine torque output during the torque phase such that the target or second torque output is achieved prior to the end of the torque phase also ensures that the air mass flow rate through the engine is stable during the transition from the torque phase to the inertia phase, and throughout the inertia phase. This is advantageous as it provides a stable reference for the control module to predict the required reduction in torque at the start of the inertia phase to reduce the speed of the engine to the post-shift synchronisation speed, which is often referred to as the torque intervention or torque hole, because the mass air flow rate through the engine is stable. This is beneficial for both engine and transmission control. This may also reduce the magnitude of the torque intervention thereby improving the smoothness and perceived drive quality during an upshift.

In an embodiment the control module may be configured to control a negative torque output of the electric machine during the torque phase to maintain constant transmission output torque, or 'wheel torque', during the torque phase. Beneficially, as the engine torque output increases during the torque phase, and the gear ratio decreases, the requirement for the electric machine to absorb or counteract the additional torque output from the engine also reduces. As such the control module may decrease the negative torque output from the electric machine during the torque phase. The control module may control the electric machine in dependence on a requested wheel torque from the user of the vehicle.

In one embodiment the electric machine may be operated as a generator. Beneficially operating the electric machine as a generator both absorbs excess torque output from the engine and also generates electricity which may be stored within a battery. In another embodiment the electric machine may be an integrated starter generator.

In an embodiment the gear ratio of the second gear is lower than the gear ratio of the first gear. As the gear ratio in an upshift decreases the engine torque output must be increased to maintain a constant wheel torque output throughout the upshift. Thus in an upshift the engine torque output increase from a first engine torque output to a second engine torque output.

In another embodiment the electric machine may be an electric motor. The electric motor may be configured to provide torque to the wheels of the vehicle such that the vehicle may be driven in an EV mode. The electric machine may also be able to provide a combined wheel torque to the wheels of the vehicle when the vehicle is being operated in a hybrid drive mode. The control module may be able to increase the negative torque output of the electric motor such that the electric motor is operated as a generator.

In one embodiment the transmission may be an automatic transmission. The control module is well suited for use with an automatic transmission as it advantageously promotes a smoother upshift and reduces the interruption of torque to the wheels of the vehicle.

In an embodiment the control module may be configured to receive an input indicative of a requested wheel torque and the control output may be configured to control the torque output of the electric machine to meet the requested wheel torque during the torque phase. This is beneficial when the user of the vehicle requests a change in the wheel torque during an upshift. The control module may vary the torque output of the electric machine to meet the requested wheel torque during an upshift. In this sense the electric machine may be operated in a torque filling mode during an upshift to meet the wheel torque request from the user of the vehicle.

In another embodiment the control output may be configured to request an increase of the engine torque from the first engine torque output to the second engine torque output prior to requesting an increase in the negative torque output of the electric machine. This is advantageous as the engine takes longer to respond than the electric machine, thus requesting the torque increase from the engine prior to requesting the increase in negative torque of the electric machine ensures a constant combined wheel torque is achieved.

In one embodiment the control output may be configured to vary the rate of the engine torque increase in dependence on the gear ratio of the first gear and the second gear. This is advantageous as the change in gear ratio between each of the gears may not be a constant step and thus the increase in engine torque output required during the torque phase to maintain a constant wheel torque may vary depending on the change in gear ratio. As such, the control module may be configured to vary the rate at which the engine torque is increased to ensure that the second or target engine torque output is reached before the end of the torque phase.

According to an aspect of the present invention there is provided a method of controlling a vehicle powertrain, the powertrain comprising a transmission, an engine and an electric machine, the engine and the electric machine together delivering a transmission input torque when both the engine and the electric machine are operational, the transmission, the engine and the electric machine together delivering a transmission output torque when both the engine and the electric machine are operational, the transmission being configured to cause a gear upshift from a first gear to a second gear in response to an increase of engine speed, wherein the gear upshift comprises a torque phase and an inertia phase following the torque phase, the method comprising: receiving an input signal indicative of a requested gear upshift, from the first gear to the second gear; determining an engine torque increase from a first engine torque output when the transmission is in the first gear to a second engine torque output when the transmission is in the second gear; generating a control output to apply the engine torque increase and control a torque output of the electric machine, such that the transmission output torque is maintained substantially constant throughout the torque phase; wherein the transmission output torque is substantially the same when: the transmission input torque comprises the first engine torque output and the transmission is in the first gear, and the transmission input torque comprises the second engine torque output and the transmission is in the second gear.

In an embodiment the method may comprise controlling a negative torque output of the electric machine during the torque phase to maintain constant transmission output torque, or 'wheel torque', during the torque phase.

In another embodiment the method may comprise operating the electric machine as a generator.

In one embodiment the method may comprise receiving an input indicative of a requested wheel torque and wherein the method may comprise controlling the torque output of the electric machine to meet the requested wheel torque during the torque phase.

According to another aspect of the present invention there is provided a powertrain comprising a transmission, an engine, an electric machine and a control module according to any one of the preceding embodiments.

According to another aspect of the present invention there is provided a vehicle comprising the control module according to any one of the preceding embodiments and/or comprising the powertrain according to the preceding aspect of the present invention.

According to another aspect of the present invention there is provided a system as described above, wherein the input for receiving one or more signals indicative of the requested gear upshift from the first gear to the second gear comprises an electronic processor having an electrical input for receiving said one or more signals each indicative of a requested gear upshift; and an electronic memory device electrically coupled to the electronic processor and having instructions stored therein, the electronic processor being configured to execute the instructions stored on the memory device to cause the processor to: determine an engine torque increase from a first engine torque output when the transmission is in the first gear to a second engine torque output when the transmission is in the second gear, wherein the second torque output is configured to deliver substantially the same combined wheel torque when the transmission is in the second gear as the first engine torque output when the transmission is in the first gear; and to generate a control output to apply the engine torque increase such that the second engine torque output is reached prior to the end of the torque phase, and to increase a negative torque output of the electric machine prior to the torque phase, such that the combined wheel torque is maintained substantially constant throughout the torque phase.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In general terms embodiments of the invention relate to a control module for a vehicle powertrain. The vehicle powertrain comprises a transmission, an engine and an electric machine. When the vehicle is accelerating, and the rotational speed of the engine is increasing the transmission is configured to cause a gear upshift. During the gear upshift the requested torque to be delivered to the wheels is constant and as such it is desirable to maintain a constant torque flow to the wheels of the vehicle.

During an upshift the gear ratio in the transmission decreases and as such the torque output of the engine must increase to maintain a substantially constant transmission output torque, or 'wheel torque'. However, increasing the torque output of an internal combustion engine is relatively slow and there is a delay between requesting an increase in torque output and delivering the increased torque. As such, a user of the vehicle may experience a decrease in wheel torque after an upshift due to the lag increasing the engine torque output.

To overcome this problem the control module is configured to request an increase in engine torque output prior to the ratio in the transmission decreasing and the torque output of the electric machine is reduced to account for the increase in torque output from the engine. As the engine torque output increases, the control module increases the negative torque output of the electric machine such that the wheel torque is substantially constant throughout the upshift.

Figure 1:
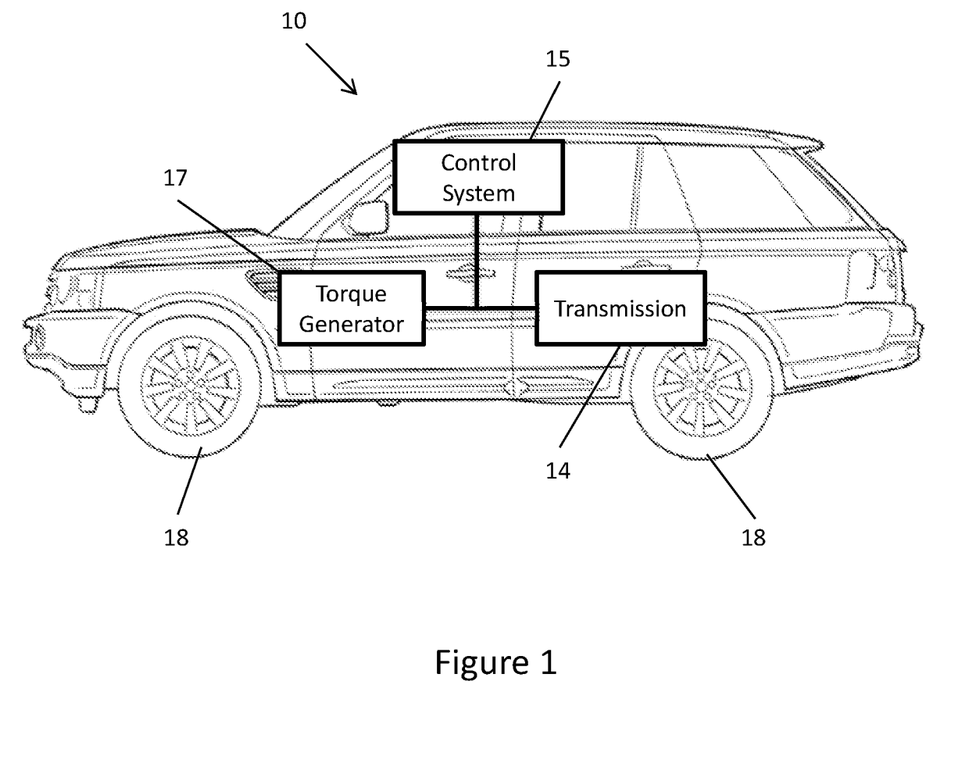
FIG. 1 is a vehicle comprising a transmission, a torque generator and a control system.

To place embodiments of the invention in a suitable context reference will firstly be made to FIG. 1. FIG. 1 shows a vehicle 10 comprising an automatic transmission 14 and a torque generator 17. The torque generator 17 and transmission 14 are mechanically coupled such that torque output by the torque generator 17 is transferred to the transmission 14 before being delivered to the wheels 18 of the vehicle 10. The torque generator 17 and transmission 14 are controlled by the control system 15.

The amount of torque delivered to the wheels 18 by the torque generator 17 is controlled by the control system 15. The control system 15 receives an input indicative of the position of the accelerator pedal (not shown) which is representative of a requested wheel torque by the user of the vehicle 10. The control system 15 provides an output signal indicative of the requested wheel torque to the torque generator 17 and transmission 14 such that the wheel torque requested by the user of the vehicle 10 is delivered to the wheels 18 by the torque generator 17. The torque generator 17 may comprise an engine and an electric machine which may be operated together to output a combined input torque to the transmission.

Figure 2:
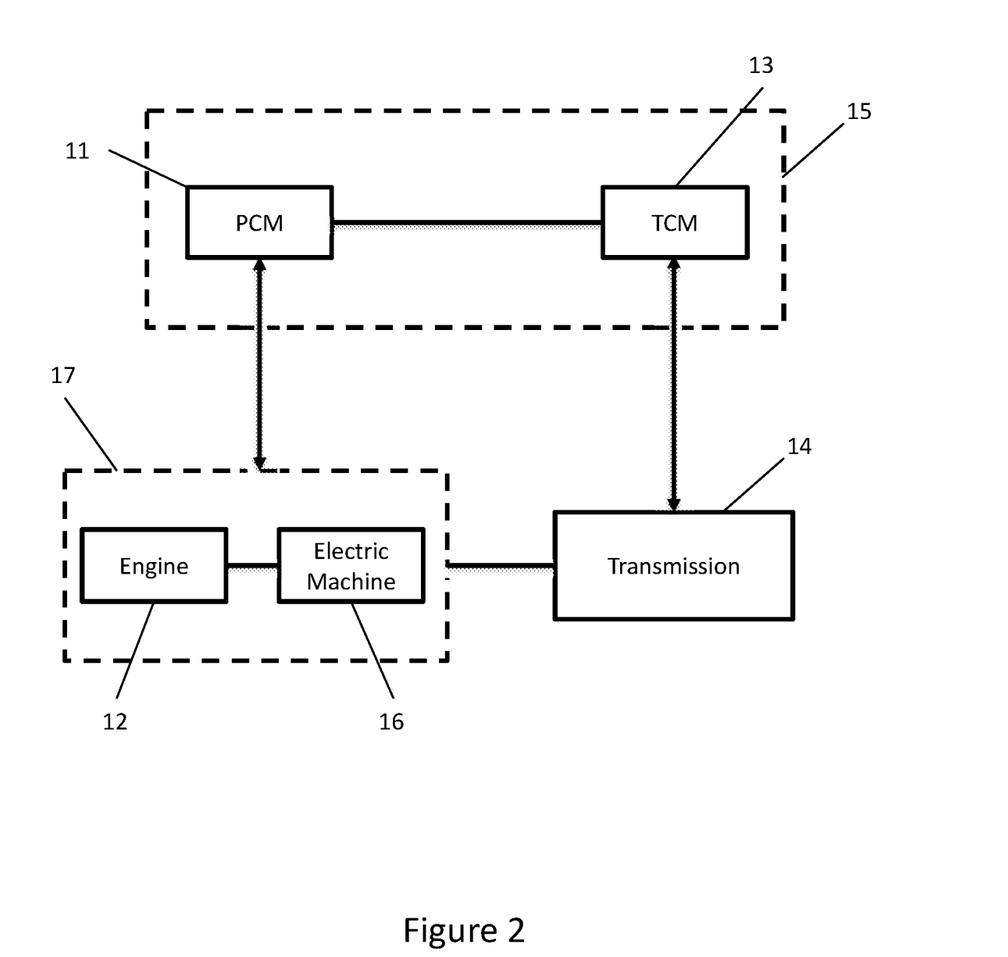
FIG. 2 is a schematic view of the control system, transmission and torque generator of FIG. 1.

Turning to FIG. 2, the torque generator 17, control system 15 and transmission 14 are shown in further detail. The control system 15 comprises two control modules, namely: a powertrain control module (PCM) 11 and a transmission control module (TCM) 13. The PCM 11 is configured to control the torque generator 17 or powertrain and the TCM 13 is configured to control the automatic transmission 14. The TCM 13 is connected to the transmission 14 and is configured to exchange information with the transmission 14 indicative of the current gear, a target gear and information relating to the current and target gear ratios. Furthermore, the TCM 13 may output a control signal to the transmission 14 to cause the transmission 14 to upshift or downshift gear.

Similarly, the PCM 11 receives information from the user of the vehicle 10 indicative of a target wheel torque to be delivered to the wheels 18 of the vehicle 10. The PCM 11 receives an input (not shown) indicative of the requested wheel torque and controls the torque generator 17 to deliver the requested torque to the wheels 18. The input is typically indicative of a position of the accelerator pedal (not shown) in the vehicle 10. As shown in FIG. 2, the torque generator 17 comprises an engine 12 and an electric machine 16. The engine 12 and electric machine 16 may deliver torque to the wheels 18 independently or in combination when operating in a hybrid mode. The electric machine 16 may be, for example, an electric motor or an integrated starter generator.

The electric machine 16 is operable as both a motor and a generator. As shown in FIG. 2 the TCM 13 is connected to the PCM 11. The TCM 13 may provide an output signal to the PCM 11 indicative of an intended upshift or downshift.

Operation of the automatic transmission 14 is controlled by the TCM 13. The automatic transmission 14 comprises multiple gear steps of varying gear ratios. The gear ratio of the gears in the transmission 14 decrease as the gear step increases. The TCM 13 operates the automatic transmission 14 based on a gear shift map to vary the gear the automatic transmission 14 is in based, at least partially, on the speed of the engine 12.

The automatic transmission 14 is a dual clutch automatic transmission such that during a gear change there is an on-coming clutch that engages the new gear or second gear and an off-going clutch which disengages the old gear or first gear. During an upshift the speed of the output shaft from the transmission 14 is substantially constant for a given vehicle speed, as the output shaft is connected to the wheels 18, and thus, the large inertia of the vehicle 10. The skilled reader will appreciate that the speed of the vehicle 10 may vary during an upshift, which would cause the speed of the output shaft to vary accordingly, however, the speed of the output shaft is unaffected by the speed of the input shaft during an upshift.

The input shaft of the transmission 14 is connected to the engine 12 which has a significantly lower inertia than the vehicle 10 and thus the output shaft. The gear ratio in an upshift decreases and as such the rotational speed of the input shaft must also decrease during an upshift to match the speed of the output shaft in the new gear. The rotational speed of the input shaft after the upshift is called the post-synchronisation speed and is the rotational speed of the input shaft that matches the speed of the output shaft in the new gear.

Typically, a gear shift in a dual clutch automatic transmission 14 comprises two main stages, namely: a torque phase 20 and an inertia phase 30. The torque phase 20 is defined as the phase in which the applied pressure in the off-going clutch begins to decrease, but the off-going clutch remains engaged without slip. As the pressure on the off-going clutch is reduced the pressure on the oncoming clutch is increased such that the oncoming clutch engages the transmission 14 with slip. This may also be referred to as the handover of the clutches. This phase in the gear shift is known as the torque phase 20 because there is no sudden change in the speed of the engine 12 or input shaft.

The second phase of the gear change is known as the inertia phase 30. During the inertia phase 30 the off-going clutch is kept in slip and the pressure on the oncoming clutch is increased until the oncoming clutch is completely engaged. The speed of the input shaft is reduced in the inertia phase 30 to the post-shift synchronisation speed. At the start of the inertia phase 30 the TCM 13 requests a reduction in torque output from the engine 12, as shown by the torque intervention 55 illustrated in FIG. 6 to reduce the speed of the engine 12. The magnitude of the reduction in torque is determined by the TCM 13 such that the speed of the engine 12 and thus input shaft are reduced to the post-shift synchronisation speed. The TCM 13 determines the reduction of torque output of the engine 12 based on the inertia of the engine 12 such that the rotational speed of the engine 12 may be accurately predicted and controlled to achieve the post-shift synchronisation speed. The reduction in torque output from the engine 12, causing the torque intervention 55, is required to reduce the engine 12 or input shaft speed to match the output shaft speed in the new gear.

The total time for the automatic transmission 14 to effect the gear change, from start to finish, is typically around 1 second. This time includes about 0.15 seconds between requesting a gear upshift and initiating the torque phase. The torque phase then typically lasts between about 0.15 seconds and 0.5 seconds depending on the gear change and the inertia phase typically takes a similar length of time, between about 0.15 seconds and 0.5 seconds.

Figure 5:
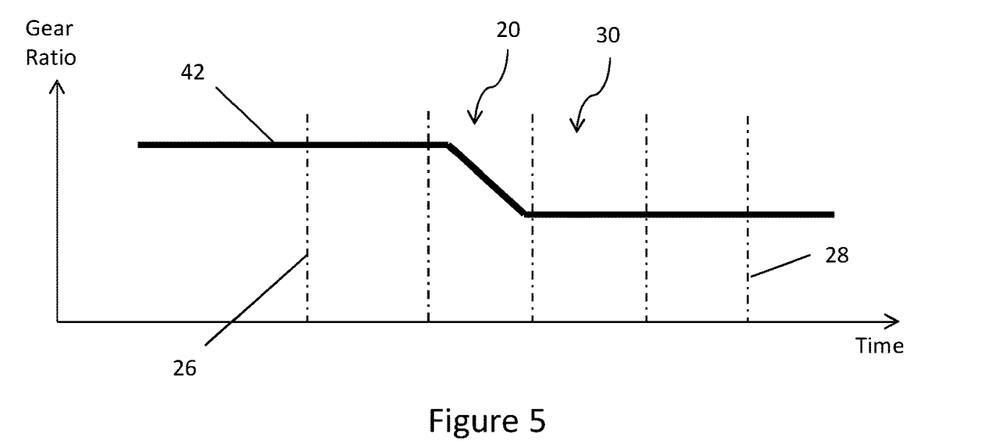
FIG. 5 is a graph showing the gear ratio of the transmission with respect to time during the upshift of FIGS. 3 and 4.
Figure 6:
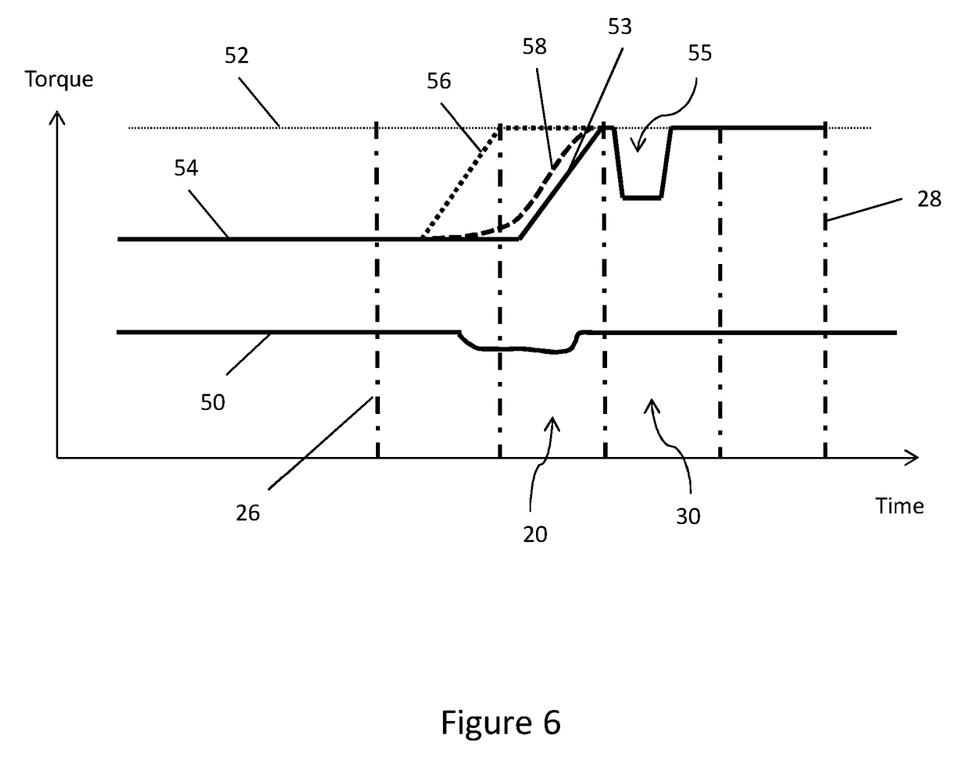
FIG. 6 is a graph showing the torque output of the torque generator with respect to time during the upshift of FIGS. 3 to 5.
Figure 7:
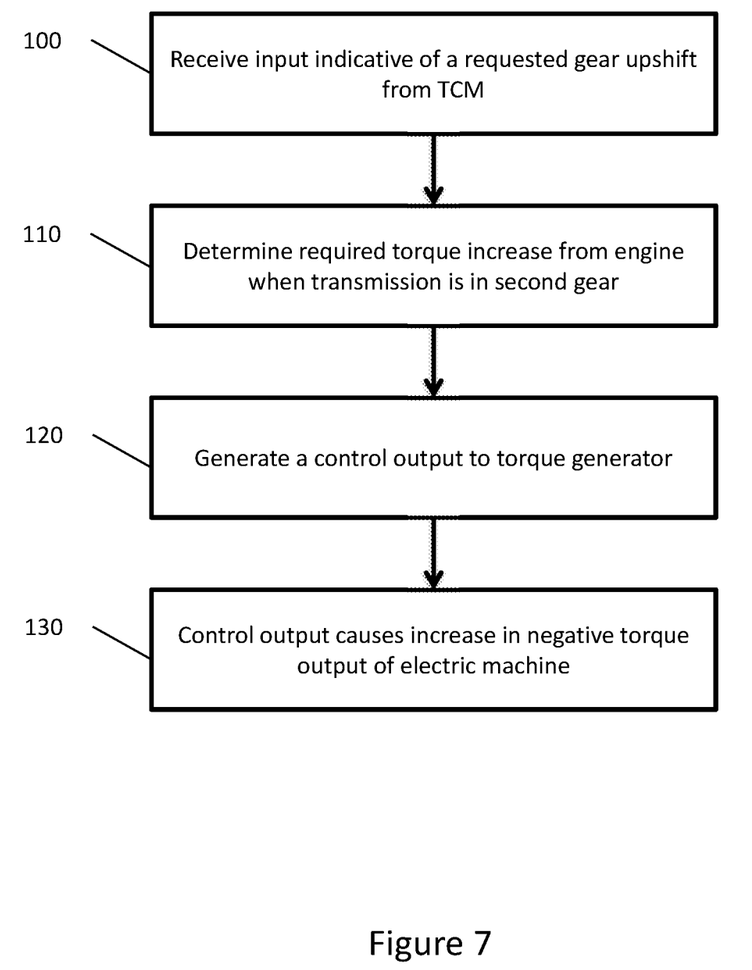
FIG. 7 is a flow chart showing a method according to an embodiment of the invention.

FIGS. 3 to 6 show graphs of how various parameters change with respect to time over the course of an upshift, the like of which may be controlled by the control system 15 or the method outlined in FIG. 7. The gear upshift illustrated in FIGS. 3 to 6 is typical of a gear upshift when the vehicle 10 is accelerating and thus the engine 12 speed is increasing. In this case there is no interruption in wheel torque during the shift process and the requested wheel torque remains substantially constant throughout. For clarity the dashed lines on each of FIGS. 3 to 6 represent corresponding points of time in the upshift.

Figure 3:
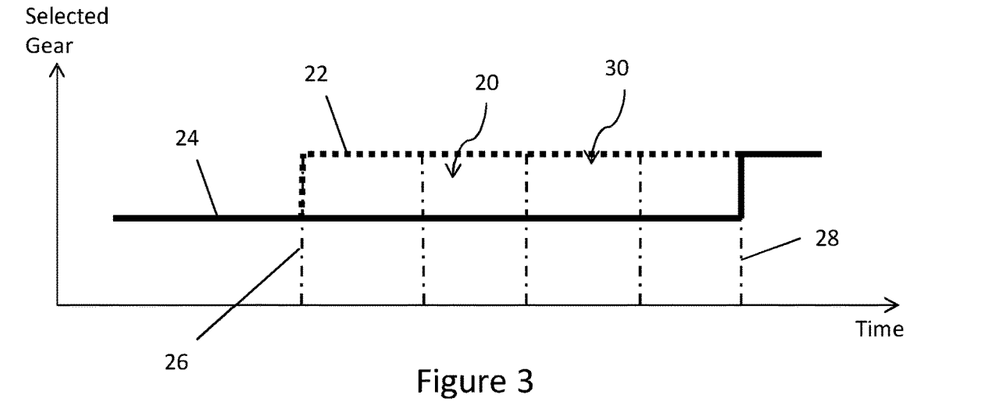
FIG. 3 is a graph showing the engaged gear in the transmission with respect to time during an upshift.

As the engine 12 speed increases the TCM 13 of the control system 15 outputs a control signal to the transmission 14 to increase the target gear as shown by line 22 in FIG. 3. After the TCM 13 outputs the control signal at the initiation point 26 to the transmission 14, the transmission 14 begins the upshift process. In the example shown the upshift process comprises changing the transmission from a first gear to a second gear. The upshift goes through the torque phase 20 and the inertia phase 30 before finally completing the gear change at a completion point 28 which occurs at a point in time after the inertia phase 30 where the second gear is fully engaged in the transmission 14. Line 24 shows the gear that the transmission 14 is in during the upshift process.

Figure 4:
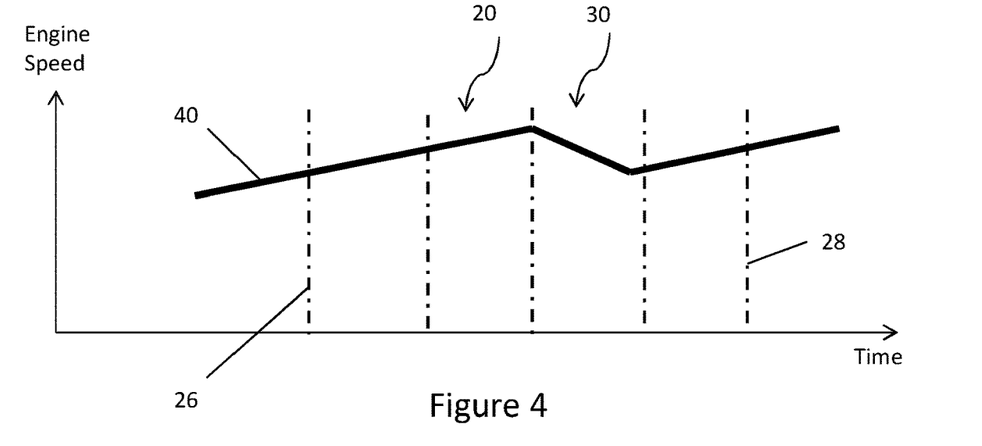
FIG. 4 is a graph showing the rotational speed of the engine with respect to time during the upshift of FIG. 3.

FIG. 4 shows how the rotational speed 40 of the engine 12 varies throughout the upshift process. Prior to the initiation point 26 the rotational speed 40 of the engine 12 increases linearly. The PCM 11 monitors the rotational speed of the engine 12 and communicates the information to the TCM 13 in the control system 15. When the rotational speed of the engine 12 reaches a threshold value, as determined by a gear shift map, the TCM 13 increases the target gear at the initiation point 26 as shown in FIG. 3. The rotational speed of the engine 12 continues to increase until the beginning of the inertia phase 30 when the oncoming clutch engages the new gear. At this point the TCM 13 requests a decrease in engine torque, as shown by the torque intervention 55, such that the engine speed 40 decreases to the post-shift synchronisation speed at the end of the inertia phase 30 before linearly increasing again when the oncoming clutch and thus the new gear is fully engaged.

FIG. 5 shows how the gear ratio 42 varies with respect to time during the gear upshift. As shown in FIG. 5 the gear ratio 42 decreases linearly during the torque phase 20 as the off-going clutch disengages the first gear and the on-coming clutch begins to engage the second gear. The gear ratio of the second gear is less than the ratio of the first gear thus the engine torque output must increase to maintain a constant wheel torque when the transmission 14 is in the second gear when compared to the torque output when in the first gear.

Turning now to FIG. 6, the torque output of the engine 12 and the electric machine 16 are shown with respect to time during the upshift process. The control system 15, and in particular, the PCM 11 controls the torque output of both the engine 12 and the electric machine 16 during the upshift to maintain a constant torque to the wheels 18 of the vehicle 10. Line 54 shows the combined torque output from the engine 12 and the electric machine 16. Line 50 shows the torque output from the electric machine 16 alone whilst line 58 shows the torque output from the engine 12. Together the engine 12 and electric machine 16 deliver a torque to the wheels 18.

For clarity, in the example shown in FIG. 6 the electric machine 16 is producing no torque output prior to the initiation point 26 and as such the combined torque output as illustrated by line 54 is equal to the torque output of the engine 12 as shown by line 58 hence line 58 is equal to line 54 prior to the initiation point 26 in the example shown. However, the skilled reader will appreciate that in another example upshift the electric machine 16 may be producing a positive or a negative torque output which would result in the wheel torque differing from the engine torque output 58 prior to the initiation point 26.

As shown in FIG. 3, the TCM 13 requests an upshift from a first gear to a second gear at the initiation point 26. When the TCM 13 requests a gear upshift a control signal is communicated to the transmission 14 and the PCM 11 from the TCM 13. The PCM 11 receives information indicative of the requested gear increase that includes the gear ratio of the target or second gear. The PCM 11 determines a required engine torque output required to maintain a constant wheel torque to the wheels 18 when the transmission 14 is in the second gear as illustrated by line 52 of FIG. 6.

The PCM 11 is configured to control the engine torque output 58 during the upshift such that the second torque output 52 is achieved prior to the end of the torque phase 30. However, there is an inherent lag associated with increasing the torque output of the internal combustion engine 12. To counteract the delay in increasing the torque output of the engine 12 the PCM 11 requests an increase in engine torque prior to the start of the torque phase 20 as shown by line 56.

Requesting an increase in engine torque output prior to the torque phase 20 advantageously allows time for the engine torque to be increased to the target torque output 52 prior to the end of the torque phase 20. As such, when the oncoming clutch is fully engaged in the inertia phase 30 the engine torque output 58 is already at the target torque output 52. Line 58 shows the actual torque output of the engine 12. As shown in FIG. 6 the actual torque output 58 lags behind the requested increase in engine torque output 56.

Conversely, varying the torque output of the electric machine 16 is much quicker than varying the torque output of the engine 12. As such, the negative torque output of the electric machine 16 may be increased prior to the torque phase 20, as the positive torque output of the engine 12 is increased, such that the torque delivered to the wheels 18 remains constant throughout the torque phase 20. As shown in FIG. 6, by line 54, the combined torque output of the engine 12 and electric machine 16 remain constant at the start of the torque phase 20 despite the increase in the engine torque 58. The electric machine 16 is controlled such that the combined torque output 54 increases linearly 53 during the torque phase until the target torque output is reached by the combined torque output 54 at the end of the torque phase 20.

The PCM 11 monitors the torque output of the engine 12 after the control signal has been sent to the engine 12 to increase the torque output to the target value 52. As the torque output of the engine 12 begins to increase, as shown by line 58, the PCM 11 controls the electric machine 16 to increase the negative torque output to maintain a constant wheel torque 18.

Prior to the torque phase 20 the negative torque output is increased from a steady state to an upshift state. In the example shown the steady state is substantially zero and the upshift state is a negative torque output equal and opposing the increase in torque output of the engine 12. In this situation the electric machine 16 operates as a generator.

At the start of the torque phase 20 the torque output of the electric machine 16 is maintained constant. This is because the gear ratio of the transmission decreases linearly during the torque phase 20, as shown in FIG. 5, and simultaneously the torque output of the engine 12 is increased linearly 53 during the torque phase 20. Thus the torque delivered to the wheels 18 is constant due to the increasing engine torque and decreasing gear ratio.

At a point prior to the end of the torque phase the gear ratio, as shown in FIG. 5, equals the ratio of the second gear and substantially simultaneously the engine torque output 58 is equal to the target torque output 52. At this point the PCM 11 controls the electric machine to decrease the negative torque output such that the torque delivered to the wheels 18 remains constant.

As outlined above, at the start of the inertia phase 30 the TCM 13 requests a decrease in the engine torque output such that the engine speed decreases to the post-shift synchronisation speed. Beneficially, by ensuring that the engine torque output equals the target torque output 52 prior to the end of the torque phase 20 the mass air flow through the engine 12 is substantially constant during the transition from the torque phase 20 to the inertia phase 30, and throughout the inertia phase 30. This is advantageous as the stable mass air flow enables the TCM 13 to accurately calculate the torque reduction required to reduce the engine speed to the post-shift synchronisation speed. Furthermore, this reduces the magnitude of the torque reduction required in the torque intervention 55 which improves the smoothness and overall drive quality experienced during the upshift.

The rate at which the torque output of the engine 12 is increased during the torque phase 20 may be varied in dependence on the change in gear ratio caused by the upshift. For example, an upshift from gear 1 to gear 2 causes a large gear ratio change, for example a ratio change of about 19 to 11, which requires a large increase in engine torque during the torque phase 20 to maintain a constant wheel torque. As such, the rate at which the engine torque is increased during the torque phase 20 in this scenario is relatively high.

In another example, the gear upshift may be from gear 7 to gear 8. In this example the change in gear ratio may be from about 3 to about 2.5 and as such the required engine torque increase during the torque phase 20 is relatively small. Thus the rate at which the engine torque output is increased during the torque phase 20 may be relatively low.

Varying the rate at which the engine torque output is increased in the torque phase 20 is beneficial as it improves the accuracy of the torque output of the engine 12 at the end of the torque phase 20. Controlling the rate at which the engine torque is increased in the torque phase 20 reduces the chance that the torque output of the engine 12 overshoots or undershoots the target torque output 52.

The example upshift outlined in FIGS. 3 to 6 assumes that a user of the vehicle 10 requests a substantially constant wheel torque throughout the duration of the upshift. However, in situations where the user of the vehicle 10 either requests an increase or a decrease in the wheel torque to be delivered to the wheels 18 the PCM 11 may control the electric machine 16 to either increase or decrease the torque output of the electric machine 16 to more quickly achieve the requested wheel torque. In this sense the electric machine 16 may be operated in a torque filling mode or the electric machine 16 may provide drive torque directly to the wheels 18 of the vehicle 10. Furthermore, the PCM 11 may vary the target torque output 52 of the engine 12 to match the requested torque output of the user of the vehicle 10 during an upshift.

FIG. 7 is a flow chart outlining the process of completing a gear upshift from a first gear to a second gear. By definition, the second gear ratio is less than the first gear ratio when considering an upshift. Step 100 outlines the first step in the process where the PCM 11 receives an input indicative of a requested gear upshift from the TCM 13. The TCM 13 determines that the transmission 14 should upshift when the engine speed reaches a threshold value as determined by a gear shift map.

Once the PCM 11 receives an input indicative of the requested gear upshift the PCM 11 determines a required torque increase from the engine 12 when the transmission 14 is in the second gear in step 110. The engine torque increase from a first engine torque output when the transmission is in the first gear to the second engine torque output when the transmission is in the second gear provides substantially the same torque to the wheels 18 of the vehicle 10. The increase in engine torque is determined in dependence on the ratio of the second gear.

In step 120 the PCM 11 generates a control output to the torque generator 17. The control output causes the engine torque output to increase such that the second engine torque output is achieved prior to the end of the torque phase. The request to increase the engine torque is sent to the engine 12 before the start of the torque phase 20. Typically, the engine torque output begins to increase prior to the start of the torque phase 20. In step 130 the control output causes an increase in negative torque output of the electric machine 16. The increase in negative torque output from the electric machine 16 accounts for the increase in positive torque generated by the engine 12 such that the torque delivered to the wheels 18 is constant throughout the torque phase.

The method outlined in FIG. 7 may be executed by the control system 15 wherein the control system 15 comprises one or more electronic processors having at least one electrical input for receiving an electrical input signal indicative of a requested gear upshift. The control system 15 comprises at least one memory device electrically coupled to the electronic processor. The memory device stores instructions that may cause the control system 15 to perform, at least, the method outlined in FIG. 7. The processor is configured to access the memory device and execute the instructions stored therein such that the processor is operable to detect an input signal at the input. The processor further comprises an output configured to provide a control output signal to, at least, the torque generator 17.

It will be appreciated that various changes and modifications can be made to the present invention without departing from the scope of the present application.

The invention may be defined according to the following numbered clauses:

1. A control module for a vehicle powertrain, the powertrain comprising a transmission, an engine and an electric machine, the engine and the electric machine together delivering a transmission input torque when both the engine and the electric machine are operational, the transmission, the engine and the electric machine together delivering a transmission output torque when both the engine and the electric machine are operational, the transmission being configured to cause a gear upshift from a first gear to a second gear in response to an increase of engine speed, wherein the gear upshift comprises a torque phase and an inertia phase following the torque phase, the control module comprising:
    an input configured to receive an input signal indicative of a requested gear upshift from the first gear to the second gear; and
    a processor configured to
    (i) determine an engine torque increase from a first engine torque output when the transmission is in the first gear to a second engine torque output when the transmission is in the second gear; and
    (ii) generate a control output to apply the engine torque increase and control a torque output of the electric machine, such that the transmission output torque is maintained substantially constant throughout the torque phase;
    wherein the transmission output torque is substantially the same when: the transmission input torque comprises the first engine torque output and the transmission is in the first gear, and the transmission input torque comprises the second engine torque output and the transmission is in the second gear.

2. A control module as defined in Clause 1, configured to control a negative torque output of the electric machine during the torque phase to maintain constant transmission output torque during the torque phase.

3. A control module as defined in Clause 1 or Clause 2, wherein the electric machine is operated as a generator.

4. A control module as defined in any preceding clause, wherein the gear ratio of the second gear is lower than the gear ratio of the first gear.

5. A control module as defined in any preceding clause, wherein the electric machine is an integrated starter generator.

6. A control module as defined in any of Clauses 1 to 4, wherein the electric machine is an electric motor.

7. A control module as defined in any preceding clause, wherein the transmission is an automatic transmission.

8. A control module as defined in any preceding clause, wherein the control module is configured to receive an input indicative of a requested wheel torque and wherein the control output is configured to control the torque output of the electric machine to meet the requested wheel torque during the torque phase.

9. A control module as defined in any preceding clause, wherein the control output is configured to request an increase of the engine torque from the first engine torque output to the second engine torque output prior to requesting an increase in a negative torque output of the electric machine.

10. A control module as defined in any preceding clause, wherein the control output is configured to vary the rate of the engine torque increase in dependence on the gear ratio of the first gear and the second gear.

11. A method of controlling a vehicle powertrain, the powertrain comprising a transmission, an engine and an electric machine, the engine and the electric machine together delivering a transmission input torque when both the engine and the electric machine are operational, the transmission, the engine and the electric machine together delivering a transmission output torque when both the engine and the electric machine are operational, the transmission being configured to cause a gear upshift from a first gear to a second gear in response to an increase of engine speed, wherein the gear upshift comprises a torque phase and an inertia phase following the torque phase, the method comprising:
    receiving an input signal indicative of a requested gear upshift, from the first gear to the second gear;
    determining an engine torque increase from a first engine torque output when the transmission is in the first gear to a second engine torque output when the transmission is in the second gear; and
    generating a control output to apply the engine torque increase and control a torque output of the electric machine, such that the transmission output torque is maintained substantially constant throughout the torque phase; wherein the transmission output torque is substantially the same when: the transmission input torque comprises the first engine torque output and the transmission is in the first gear, and the transmission input torque comprises the second engine torque output and the transmission is in the second gear.

12. A method as defined in Clause 11, wherein the method comprises controlling a negative torque output of the electric machine during the torque phase to maintain constant transmission output torque during the torque phase.

13. A method as defined in Clause 11 or Clause 12, wherein the method comprises operating the electric machine as a generator.

14. A method as defined in any one of Clauses 11 to 13, wherein the method comprises receiving an input indicative of a requested wheel torque and wherein the method comprises controlling the torque output of the electric machine to meet the requested wheel torque during the torque phase.

15. A powertrain comprising a transmission, an engine, an electric machine and a control module according to any one of Clauses 1 to 10.

16. A vehicle comprising the control module of any one of Clauses 1 to 10 or comprising the powertrain of Clause 15.

The invention claimed is:

1. A control module for a vehicle powertrain, the powertrain comprising a transmission, an engine and an electric machine, the engine and the electric machine together delivering a transmission input torque when both the engine and the electric machine are operational, the transmission, the engine and the electric machine together delivering a transmission output torque when both the engine and the electric machine are operational, the transmission being configured to cause a gear upshift from a first gear to a second gear in response to an increase of engine speed, wherein the gear ratio of the second gear is lower than the gear ratio of the first gear, wherein the gear upshift comprises a torque phase and an inertia phase following the torque phase, the control module comprising:
 an input configured to receive an input signal indicative of a requested gear upshift from the first gear to the second gear; and
 a processor configured to:
  (i) determine an engine torque increase from a first engine torque output when the transmission is in the first gear to a second engine torque output when the transmission is in the second gear; and
  (ii) generate a control output to apply the engine torque increase and control a negative torque output of the electric machine during the torque phase, such that the transmission output torque is maintained substantially constant throughout the torque phase;
 wherein the transmission output torque is substantially the same when: the transmission input torque comprises the first engine torque output and the transmission is in the first gear, and the transmission input torque comprises the second engine torque output and the transmission is in the second gear.

2. A control module as claimed in claim 1, wherein the electric machine is operated as a generator.

3. A control module as claimed in claim 1, wherein the control output is configured to request an increase of the engine torque from the first engine torque output to the second engine torque output prior to requesting an increase in a negative torque output of the electric machine.

4. A control module as claimed in claim 1, wherein the electric machine is an integrated starter generator.

5. A control module as claimed in claim 1, wherein the electric machine is an electric motor.

6. A control module as claimed in claim 1, wherein the transmission is an automatic transmission.

7. A control module as claimed in claim 1, wherein the control module is configured to receive an input indicative of a requested wheel torque and wherein the control output is configured to control the torque output of the electric machine to meet the requested wheel torque during the torque phase.

8. A vehicle comprising the control module of claim 1.

9. A control module as claimed in claim 1, wherein the control output is configured to vary the rate of the engine torque increase in dependence on the gear ratio of the first gear and the second gear.

10. A method of controlling a vehicle powertrain, the powertrain comprising a transmission, an engine and an electric machine, the engine and the electric machine together delivering a transmission input torque when both the engine and the electric machine are operational, the transmission, the engine and the electric machine together delivering a transmission output torque when both the engine and the electric machine are operational, the transmission being configured to cause a gear upshift from a first gear to a second gear in response to an increase of engine speed, wherein the gear ratio of the second gear is lower than the gear ratio of the first mar, wherein the gear upshift comprises a torque phase and an inertia phase following the torque phase, the method comprising:
 receiving an input signal indicative of a requested gear upshift, from the first gear to the second gear;
 determining an engine torque increase from a first engine torque output when the transmission is in the first gear to a second engine torque output when the transmission is in the second gear; and
 generating a control output to apply the engine torque increase and control a negative torque output of the electric machine during the torque phase, such that the transmission output torque is maintained substantially constant throughout the torque phase; wherein the transmission output torque is substantially the same when: the transmission input torque comprises the first engine torque output and the transmission is in the first gear, and the transmission input torque comprises the second engine torque output and the transmission is in the second gear.

11. A method as claimed in claim 10, wherein the method comprises operating the electric machine as a generator.

12. A method as claimed in claim 10, wherein the method comprises receiving an input indicative of a requested wheel torque and wherein the method comprises controlling the torque output of the electric machine to meet the requested wheel torque during the torque phase.

* * * * *